(12) United States Patent
Azhari

(10) Patent No.: US 12,630,424 B2
(45) Date of Patent: May 19, 2026

(54) METHOD FOR MANUFACTURING SULPHURIC ACID

(71) Applicant: OCP SA, Casablanca (MA)

(72) Inventor: Yassine Azhari, Safi (MA)

(73) Assignee: OCP SA, Casablanca (MA)

( * ) Notice: Subject to any disclaimer, the term of this patent is extended or adjusted under 35 U.S.C. 154(b) by 693 days.

(21) Appl. No.: 18/004,371

(22) PCT Filed: Jul. 12, 2021

(86) PCT No.: PCT/MA2021/000015
§ 371 (c)(1),
(2) Date: Jan. 5, 2023

(87) PCT Pub. No.: WO2022/015130
PCT Pub. Date: Jan. 20, 2022

(65) Prior Publication Data
US 2023/0294990 A1 Sep. 21, 2023

(30) Foreign Application Priority Data
Jul. 16, 2020 (FR) ...................................... 2007464

(51) Int. Cl.
*C01B 17/79* (2006.01)
*C01B 17/80* (2006.01)
(52) U.S. Cl.
CPC ............ *C01B 17/79* (2013.01); *C01B 17/803* (2013.01)
(58) Field of Classification Search
None
See application file for complete search history.

(56) References Cited

U.S. PATENT DOCUMENTS 3,432,263 A * 3/1969 Ohsol ................. C01B 17/7655
423/529
3,475,120 A * 10/1969 Benefield .............. C01B 17/765
423/535
(Continued)

FOREIGN PATENT DOCUMENTS

CL 2017001412 A1 2/2018
CL 2019000560 A1 8/2019
(Continued)

OTHER PUBLICATIONS

French Preliminary Search Report for Application No. FR 2007464 dated Apr. 8, 2021, 2 pages. [See p. 1, categorizing the cited references].

(Continued)

*Primary Examiner* — John J Figueroa
(74) *Attorney, Agent, or Firm* — Lerner David LLP

(57) ABSTRACT

The invention relates to a method for manufacturing sulphuric acid, which involves converting sulphur dioxide $SO_2$ into sulphur trioxide $SO_3$, by injecting gaseous sulphur dioxide into a converter (1) inside which at least one mass (2) of a catalyst for the conversion is present, and according to which, during phases in which the injection of the gaseous sulphur dioxide is stopped, the space inside the converter (1) is heated in such a way as to maintain a minimum temperature of 200° C., and preferably 250° C., within each catalyst mass (2), characterized by the fact that the stopping of the injection of the sulphur dioxide is slaved to the starting of the heating, and vice versa.

8 Claims, 1 Drawing Sheet

(56)                    References Cited

U.S. PATENT DOCUMENTS

| | | | | | | |
|---|---|---|---|---|---|---|
| 3,536,446 | A | * | 10/1970 | Maurer | ............... | C01B 17/7655 |
| | | | | | | 423/535 |
| 3,620,673 | A | * | 11/1971 | Browder, Jr. | ....... | C01B 17/7655 |
| | | | | | | 423/532 |
| 3,789,019 | A | | 1/1974 | Stiles | | |
| 3,988,129 | A | * | 10/1976 | Fornoff | ................... | C01B 17/60 |
| | | | | | | 95/137 |
| 4,158,048 | A | * | 6/1979 | Leclercq | ................. | C01B 17/78 |
| | | | | | | 423/533 |
| 4,576,813 | A | * | 3/1986 | McAlister | ............. | C01B 17/765 |
| | | | | | | 423/532 |
| 5,683,670 | A | * | 11/1997 | Peng | ................... | C01B 17/7655 |
| | | | | | | 423/243.01 |
| 2017/0107108 | A1 | * | 4/2017 | Lyne | ........................ | B01J 23/42 |

FOREIGN PATENT DOCUMENTS

| | | | |
|---|---|---|---|
| FR | 2166075 | A1 | 8/1973 |
| WO | 2011128841 | A1 | 10/2011 |
| WO | 2016096867 | A1 | 6/2016 |
| WO | 2017001463 | A1 | 1/2017 |
| WO | 2017076673 | A1 | 5/2017 |
| WO | 2018046791 | A1 | 3/2018 |

OTHER PUBLICATIONS

International Search Report for Application No. PCT/MA2021/
000015 mailed Sep. 20, 2021, 2 pages.

* cited by examiner

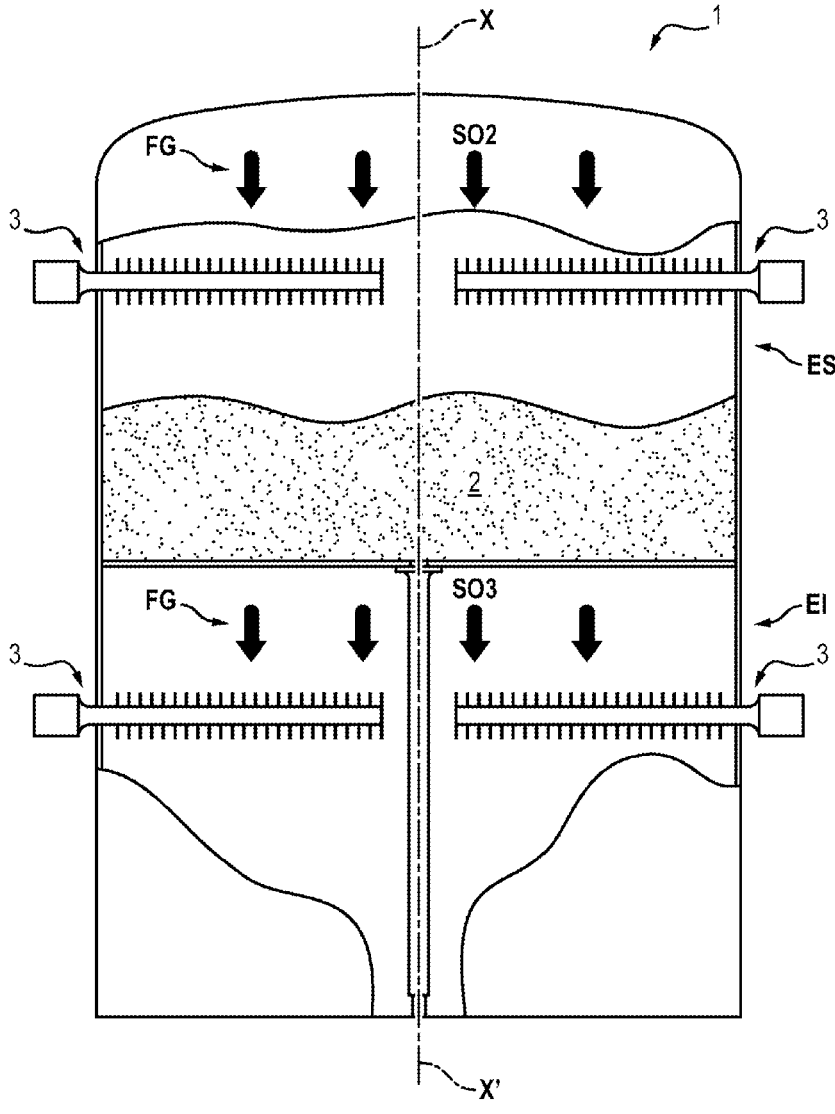

METHOD FOR MANUFACTURING SULPHURIC ACID

CROSS-REFERENCE TO RELATED APPLICATIONS

The present application is a national phase entry under 35 U.S.C § 371 of International Application No. PCT/MA2021/000015 filed Jul. 12, 2021, which claims priority from French Application No. 2007464, filed Jul. 16, 2020, all of which are hereby incorporated herein by reference.

GENERAL TECHNICAL FIELD

The present invention lies in the field of the manufacture of sulfuric acid.

It relates more particularly to a method for manufacturing this acid.

PRIOR ART

The most common method for manufacturing sulfuric acid consists in catalyzing, using vanadium pentoxide ($V_2O_5$), the oxidation of sulfur dioxide ($SO_2$) into sulfur trioxide ($SO_3$), then recovering it in sulfuric acid ($H_2SO_4$) to form high disulfuric acid ($H_2S_2O_7$) oleum, which yields two molecules of sulfuric acid by hydration.

It is also possible to use a cesium-based catalyst.

More specifically, the production of sulfuric acid results from the absorption of gaseous sulfur trioxide $SO_3$ following the reaction:

$$SO_3 + H_2O \rightarrow H_2SO_4.$$

This sulfur trioxide is obtained by oxidation of sulfur dioxide $SO_2$ in a converter containing the catalyst, namely vanadium pentoxide. The corresponding reaction is as follows:

$$SO_2 + \tfrac{1}{2}O_2 \rightarrow SO_3.$$

The prior art on this field can be illustrated by the documents WO2017/076673, FR2166075, WO2011/128841 and WO2017/001463.

The $SO_2$ is injected into the converter in which it circulates in contact with vanadium pentoxide masses, these masses being in the form of clusters of $V_2O_5$ granules.

The corresponding reaction is exothermic. Thus, the gas which enters the converter is at around 400° C. and comes out at around 600° C.

Such a method is very successful because its yield is around 98%.

However, the $SO_2/SO_3$ converters occasionally undergo shutdown phases, for example for maintenance reasons, or due to unforeseeable breakdowns or power outages.

This shutdown cannot exceed 36 hours, which corresponds to the duration of degradation of vanadium pentoxide, by reaching the dew point of the gas in the masses of this catalyst.

Unless provided that each shutdown does not exceed 36 hours, it is then absolutely necessary to blow the line to maintain the proper operation of the Vanadium. By the expression "blowing the line" is meant that the production line is shutdown while evacuating all the gases from the enclosure to avoid degradation of the vanadium. Such blowing is done with the help of a fan.

This difficulty is considered not only as a disadvantage but also as a technical peculiarity of this method, without it having been managed so far to be overcome.

PRESENTATION OF THE INVENTION

The object of the invention is to overcome these difficulties by proposing in particular a method which allows to dispense with this maximum shutdown duration of 36 hours.

Thus, according to a first aspect, the present invention proposes a method for manufacturing sulfuric acid, which involves converting sulfur dioxide $SO_2$ into sulfur trioxide $SO_3$, by injecting gaseous sulfur dioxide into a converter inside which at least one mass of a catalyst for said conversion is present and according to which, during phases in which the injection of said gaseous sulfur dioxide is stopped, the space inside said converter is heated in such a way as to maintain a minimum temperature of 200° C., preferably 250° C., within each catalyst mass, characterized in that the fact that the stopping of the injection of sulfur dioxide is slaved to the starting of the heating, and vice versa.

Thanks to these characteristics, it is possible to maintain the catalyst at a suitable temperature, so that it does not deteriorate and is perfectly operational as soon as sulfur dioxide is again injected into the converter.

In this way, there is no longer a time limit when stopping the installation.

According to other advantageous and non-limiting characteristics of this method, taken alone or according to a technically compatible combination of at least two of them:

- heating is carried out using electric resistors provided with fins;
- heating is carried out using heating means protected by a refractory material resistant to sulfur dioxide and sulfur trioxide gases;
- heating is carried out using heating means provided with a cast iron protection resistant to high temperatures;
- heating means are disposed above and below each catalyst mass;
- said catalyst used is vanadium pentoxide or is based on cesium.

PRESENTATION OF THE DRAWINGS

Other characteristics and advantages of the invention will become apparent from the description which will now be made thereof, with reference to the appended drawing, which represents, in an indicative but not limiting manner, a possible embodiment.

On this drawing:

FIG. 1 is a simplified view in vertical section of a converter which is part of an installation allowing the implementation of the method according to the present invention.

DETAILED DESCRIPTION OF THE INVENTION

As has been specified above, the object of the present invention is a method for manufacturing sulfuric acid, which involves converting sulfur dioxide $SO_2$ into sulfur trioxide $SO_3$, by injecting gaseous sulfur dioxide into a converter inside which at least one mass of a catalyst for said conversion is present.

According to this method, during phases in which the injection of said gaseous sulfur dioxide is stopped, the space inside said converter is heated in such a way as to maintain a minimum temperature of 200° C., preferably 250° C., within each catalyst mass.

An example of such a converter 1 is shown very schematically in the appended FIG. 1.

The latter takes the form of a tower with a circular base whose axis of revolution is referenced X-X'. Two lower EI and upper ES stages are shown here.

A mass that is to say a bed (mass) of catalyst consisting of vanadium pentoxide, which is present in the upper stage ES is referenced 2. In a variant not shown, there could be several masses.

Moreover, the arrows FG represent the gas flow of sulfur dioxide which is accepted in the converter with a view to its conversion into sulfur trioxide made possible thanks to the presence of catalyst.

In normal operation, the conversion reaction is exothermic and the temperature generated is sufficient to maintain the catalyst in a non-degraded state.

During shutdowns in the production of sulfur trioxide, that is to say when the supply of sulfur dioxide is cut off, the interior space of the converter 1 is then heated to maintain the temperature indicated above at minimum within the mass 2. Thus, it is ensured that the catalyst does not deteriorate and remains operational as soon as the installation is restarted later.

In the embodiment shown in the FIGURE, use is made of electric heating resistors 3 provided with fins, in order to maximize the diffusion of heat towards the catalyst. However, other embodiments of these resistors can be considered.

Thus, it is possible to install cylindrical heating elements with refractory material resistant to $SO_2$ and $SO_3$ gases, or elements with standard heating material with high temperature resistant cast iron protection.

To guarantee the most homogeneous temperature in the catalyst mass, it is advantageous to have heating means above and below each catalyst mass.

In accordance with the method according to the invention, for a more practical operation of the installation and a particularly easy implementation of the method, the fact that the stopping of the injection of sulfur dioxide is slaved to the starting of the heating, and vice versa. Thus, one does not have to worry about starting the heating means, respectively stopping them.

Preferably, care will be taken to provide a sufficient number of heating elements with adequate dimensions to obtain a uniform temperature within the catalyst mass. Thus, depending on the radius of the converter shown in FIG. 1, the appropriate length will be calculated via calculations of the exchange volume necessary for each mass.

As indicated above, vanadium pentoxide constitutes a preferred catalyst for implementing the invention. However, it is possible to consider using another catalyst, such as a cesium-based catalyst.

The invention claimed is:

1. A method for manufacturing sulfuric acid, comprising:
   injecting gaseous sulfur dioxide into a converter for the conversion of sulfur dioxide $SO_2$ into sulfur trioxide $SO_3$, the converter comprising at least one mass of a catalyst for the conversion; and
   stopping the injection of gaseous sulfur dioxide into the converter and automatically heating the space inside the converter to maintain a minimum temperature of 200° C. within the at least one mass of catalyst.

2. The method according to claim 1, wherein said heating is carried out using electric resistors provided with fins.

3. The method according to claim 1, wherein said heating is carried out using heating means protected by a refractory material resistant to sulfur dioxide and sulfur trioxide gases, or provided with a cast iron protection resistant to high temperatures.

4. The method according to claim 1, wherein said heating means are disposed above and below each mass of catalyst.

5. The method according to claim 1, wherein said catalyst is vanadium pentoxide or is based on cesium.

6. The method according to claim 2, wherein said heating is carried out using heating means protected by a refractory material resistant to sulfur dioxide and sulfur trioxide gases, or provided with a cast iron protection resistant to high temperatures.

7. The method according to claim 1, wherein the space inside the converter is heated to maintain a minimum temperature of 250° C. when the injection of gaseous sulfur dioxide is stopped.

8. The method according to claim 1, further comprising automatically stopping the heating when gaseous sulfur dioxide is injected into the converter.

\* \* \* \* \*